United States Patent Office 3,549,650
Patented Dec. 22, 1970

3,549,650
PROCESS FOR PREPARING N-BRANCHED-CHAIN ALKYL AND CYCLOALKYL 2-BENZOTHIAZOLE SULFENAMIDES
John Joseph D'Amico, Dunbar, W. Va., assignor to Monsanto Company, St. Louis, Mo., a corporation of Delaware
No Drawing. Continuation-in-part of application Ser. No. 360,138, Apr. 15, 1964, which is a continuation-in-part of application Ser. No. 153,239, Nov. 17, 1961. This application Dec. 22, 1966, Ser. No. 603,788
Int. Cl. C07d 91/48
U.S. Cl. 260—306.6
14 Claims

ABSTRACT OF THE DISCLOSURE

Making benzothiazole sulfenamides by oxidative condensation in water miscible monohydric alcohol of substantially equivalent proportions of 2-mercaptobenzothiazole or 2,2'-dithiobis(benzothiazole) and lower secondary alkyl-, lower tertiary alkyl-, or lower cycloalkylamine with aqueous oxidizing agent such as alkali metal hypohalite and converting the organic components of the reaction mixture containing sulfenamide product to substantially complete solution.

---

This application is a continuation-in-part of Ser. No. 360,138, filed Apr. 15, 1964, and now abandoned, which was in turn a continuation-in-part of Ser. No. 153,239 filed Nov. 17, 1961, now U.S. Pat. 3,144,652.

The present invention relates to the manufacture of sulfenamides and more particularly to the manufacture of N-branched-chain alkyl and cycloalkyl 2-benzothiazole sulfenamides.

It is an object of the present invention to avoid the substantial excess of amine heretofore necessary for obtaining the sulfenamides in satisfactory yield directly from branched-chain alkyl amines. Oxidative condensation of mercaptobenzothiazole or disulfide thereof with amines is carried out on a large scale. It was early recognized that the reactions could be performed in aqueous alkaline medium, if desired, in the presence of indifferent organic solvent, and aqueous medium proved eminently satisfactory for commercial use. Sulfenamides are insoluble in water and readily recovered from water by filtration. However, recovery of unreacted amine is often difficult.

Branched-chain lower alkyl amines, by which are meant amines having secondary or tertiary lower alkyl attached to the nitrogen, are desirable intermediates for the preparation of sulfenamides because they are economical, and the products have considerable processing safety when used to accelerate the vulcanization of rubber. However, they have heretofore been required in at least 50% excess of the theoretical amount. This is too much to discard, but recovery is troublesome because lower branched-chain alkyl amines are highly volatile. For example, the boiling point of isopropylamine is only about 32° C., and substantial quantities of this highly volatile amine are easily lost during filtration and other operations.

Cyclohexylamine has been oxidatively condensed with mercaptobenzothiazole in ethanol at 15° C. employing about four and one-half moles of cyclohexylamine per mole of mercaptobenzothiazole. The reaction is described in British Pat. 519,617, but the technology for reacting in aqueous medium substantially equivalent proportions of cyclohexylamine and mercaptobenzothiazole in high yield was discovered early in the development of thiazole sulfenamide accelerators and used on a large commercial scale. Demand for higher quality product in some areas was met by modfying the procedure but at the sacrifice of yield. There was no apparent reason to continue experimenting with organic solvents. However, a process has now been discovered which reduces the sacrifice of yield for improved quality. The process is also advantageous for obtaining high yield of quality product from any alkyl or alicyclic amine.

According to this invention, oxidative condensation of substantially equal moles of mercaptobenzothiazole and alkyl or alicyclic amine and preferably lower alkyl branched-chain amine or cyclohexyl amine is effected in alcoholic solvent with inorganic oxidizing agent. The sulfenamide is isolated from the reaction; and, if desired, the solvent can also be recovered. Of course, if desired, excess amine can be used and also recovered. Low-boiling alcohols are most satisfactory solvents, especially water-miscible lower alcohols of 2 to 4 carbon atoms. In place of mercaptobenzothiazole, 2,2'-dithiobis(benzothiazole) may be substituted, in which case a substantially equivalent proportion of amine should be used. By equivalent proportion is meant a proportion substantially equivalent to the theoretical quantity depending upon the thiazole reactant. The exact theoretical quantity is one mole per mole of product to be formed. Due to variation in weighing and other uncontrollable variables inherent in a chemical process, it is expedient to use somewhat more than the exact theoretical quantity, thereby providing a margin of safety. Substantially the theoretical quantity will be understood to include a modest excess sufficient uniformly to provide optimum yields but not more than about 20% in excess of the exact theoretical quantity.

The preferred organic solvent is isopropanol, but ethanol and t-butanol also give good results. The preferred inorganic oxidizing agent is NaOCl. Others which may be mentioned are NaOBr, KOCl, NaOI, $H_2O_2$, $K_2S_2O_8$, and $K_3Fe(CN)_6$. An advantage of the process is the utility of economical inorganic oxidizing agents. Where appropriate the oxidizing agent may be added in the form of an aqueous solution.

The branched-chain lower alkyl amines may be represented by the formula

where R is secondary or tertiary lower alkyl or lower cycloalkyl, as for example, isopropyl, secondary butyl, tertiary butyl, secondary amyl, tertiary amyl, tertiary octyl, cyclohexyl, or methylcyclohexyl. R' is hydrogen, lower alkyl, or lower cycloalkyl. In general, probably due to steric hindrance resulting from the branching of R at the nitrogen atom, these amines resist oxidative condensation to sulfenamides. Long reaction times have been resorted to in the past. As will hereinafter become apparent, the new process employs short contact times.

As noted, the success of the reaction is in nowise dependent upon completely anhydrous conditions. In fact, with isopropanol the initial charge may contain material quantities of water. For example, 80% isopropanol caused no diminution in yield or quality of product, and azeotropic 88% isopropanol is entirely satisfactory. On the other hand, excessive quantities of water adversely affect both yield and product quality. The amount and concentration of isopropanol can vary, and operable limits cannot be defined for all conditions, but a few simple experiments of routine nature will determine suitability of any concentration of isopropanol desired in a given instance. Deliberate addition of water is considered disadvantageous and increases the load on the isopropanol recovery system. The amount of solvent used should be sufficient to give an easily stirrable reaction mixture.

As reaction proceeds, sulfenamide dissolves in the alcoholic solvent medium; but it is preferred to use insufficient solvent to dissolve all of the sulfenamide produced after the strongly exothermic oxidative condensation reaction has subsided. However, it is important to achieve substantially complete liquid phase of the organic components of the reaction mixture before recovering the sulfenamide. No organic solids should be visible. Conversion to substantially complete liquid phase may be accomplished by heating. Heating drives the sulfenamide reaction further toward completion and converts insoluble impurities to water-soluble form. Thus, the organic phase of the reaction mixture containing sulfenamide is converted to substantially complete solution either by using sufficient solvent to dissolve all of the product as it is formed or preferably lesser amounts sufficient to achieve substantially complete solution upon heating. The main reaction is preferably conducted below 60° C. followed by heating at not more than about 75° C. to achieve liquid phase of the organic components. It will be appreciated that too low concentration of alcohol will prevent solution of the sulfenamide before recovery.

The sulfenamide crystallizes upon cooling the solution thereof, and further quantities may be recovered by addition of water. Disulfide [2,2'-dithiobis(benzothiazole)] is insoluble in alcohols, and the invention provides a process which assures complete conversion of the thiazole reactant by providing a solution of the sulfenamide substantially free of disulfide. The addition of an excess of water to effect complete precipitation may also precipitate traces of by-products, but most of these will be deposited on the surface of the sulfenamide product and can easily be removed by an alcohol or alcohol-water wash. Moreover, having the organic components in solution before recovery of the sulfenamide enables one to control the quality of the precipitated product at will by controlling the amount of dilution water.

The temperature for carrying out the process will in general fall within the range of 45°–80° C. However, these are not the absolute limits, and temperature either higher or lower can be used under some circumstances. The optimum temperature will vary depending upon other reaction conditions. Of course, increasing the reaction temperature reduces reaction time, but for optimum yields the temperature should be low enough to avoid significant decomposition of the product. Optimum results may be secured at reaction temperatures of 45°–60° C. under the conditions of the following examples. As the reactions described in Examples 1 to 4 proceed, the initial slurry gradually gives the appearance of a turbid liquid; but upon discontinuing the stirring, it separates into two clear liquid layers. The aqueous salt layer may be drawn off and discarded and the product removed from the organic layer or other means of recovery employed. A variety of procedures for washing and drying arylenethiazole sulfenamides are described in the technical and patent literature, and any of these may be used in connection with the process of this invention. For example, warm water may be added to the reaction mixture and the reaction mixture heated, following which sulfenamide is drawn off. The wet molten sulfenamide may then be fed into a steam-jacketed, tubular - bowl centrifugal separator operated above the melting point of the product.

When using sodium hypochlorite as the oxidizing agent, optimum yields are usually secured with 25–100% excess of the calculated theoretical quantity. Quantities in excess of the theoretical are apparently consumed in side reactions. Obtaining a persistent positive test for free-oxidizing agent provides a convenient test for completion of the reaction. For large scale operations, where heat transfer problems impede rapid cooling, it is important to achieve substantially complete solution of the organic components under oxidizing conditions and to maintain oxidizing conditions until the reaction mixture cools; otherwise, significant loss of yield may occur. The aqueous layer is essentially a solution of sodium chloride, and in some instances solid salts may be present. Separation of the aqueous layer before recovering the sulfenamide is not necessary. If one desires, a hot filtration, for example at 65°–70° C., of the reaction mixture may be carried out in connection with recovering the sulfenamide.

EXAMPLE 1

The reaction was carried out in a one-liter, three-necked resin flask, equipped with a stirrer, condenser, thermometer, and dropping funnel. A stirred slurry containing 84.5 grams (0.5 mole based on chemical assay) of mercaptobenzothiazole, 29.6 grams (0.5 mole) of isopropylamine, and 400 ml. of isopropyl alcohol was heated to 45° C. over a 15-minute period. To this stirred slurry at 45°–50° C., aqueous sodium hypochlorite (17.2 grams per 100 ml.) was added dropwise at 45°–50° C. over a 1.5-hour period. The hypochlorite added was within the range of 260 ml. to 326 ml. Upon stopping the stirrer, a two-layer system was noted. The stirred reaction mixture was cooled to 25° C. after which 5 grams of sodium sulfite and 600 ml. of water were added slowly over a 10-minute period. The resulting precipitate was stirred at 25°–30° C. for 15 minutes and the precipitate collected by filtration, washed with water until the washings were neutral to litmus, and air-dried at 50° C. N-isopropyl-2-benzothiazole sulfenamide was obtained in a yield of 89–90%, melting point, 96°–97° C. The product possessed exceptional stability. After heating 8 weeks at 50° C. the ether insolubles were only a trace, indicating absence of disulfide which usually forms.

EXAMPLE 2

A stirred slurry containing 83.2 grams (0.25 mole) of 2,2'-dithiobis(benzothiazole), 29.6 grams (0.5 mole) of isopropylamine, and 300 ml. of isopropyl alcohol was heated at 450–50° C. for 10 minutes. To this stirred slurry 144 ml. (0.33 mole) of aqueous sodium hypochlorite (17.2 grams per 100 ml.) was added dropwise at 45°–50° C. over a 1.5-hour period. There was then added 50 ml. of water and the stirrer stopped, whereupon a two-layer system was noted. The stirred reaction mixture was cooled to 25° C. after which 5 grams of sodium sulfite and 600 ml. of water were added slowly over a ten-minute period. The reaction mixture was stirred at 25°–30° C. for 15 minutes and then filtered. The precipitate was washed with water until the washings were neutral to litmus, and air-dried at 50° C. N-isopropyl-2-benzothiazole sulfenamide was obtained in a yield of 89.2%, melting point 94°–96° C. After heating 8 weeks at 50° C. the ether-insoluble content was only about 1%.

Cooper and D'Amico, U.S. 2,807,620, using aqueous reaction medium, reported that to obtain high yields of sulfenamide from isopropylamine it was necessary to use 50% excess of amine. This was confirmed by studying the effect of amine ratio in the following procedure: To a stirred solution of 631 grams of aqueous sodium mercaptobenzothiazole solution containing 0.5 mole of sodium mercaptobenzothiazole, isopropylamine was added dropwise in 15 minutes. Stirring was continued for 15 minutes, and 120 ml. (0.36 mole) of 25%-sulfuric acid was added dropwise over a 15-minute period. After heating the slurry to 45° C., 260 ml. (0.60 mole—20% excess) of aqueous sodium hypochloride (17.2 grams per ml.) was added dropwise at 45°–50° C. in 1.5 hours. There was then added 400 ml. of hot (50° C.) water and the reaction mixture stirred an additional hour at 45°–50° C. After adding 2 grams of sodium sulfite to the reaction mixture, it was cooled to 25° C. and filtered. The solids were washed with water until the washings were neutral to litmus, and air-dried at 50° C. The product contained an average of 1.48% ether-insoluble material which increased to 2.80% after 8 weeks at 50° C. Yields equivalent to those described in Examples 1 and 2 were obtained only when the mole ratio of amine to mercaptobenzothiazole was 1.5. When the ratio of amine to mercaptobenzothiazole was lowered, the yields dropped drastically. The procedure was the same as described above except that 102 ml. (0.306 mole) of 25%-sulfuric acid was used when the mole ratio of amine to mercaptothiazole was 1.25 and 84 ml. (0.25 mole) of 25%-sulfuric acid was used when the mole ratio of amine to mercaptobenzothiazole was 1. The results are summarized below: Mole ratio amine to mercaptobenzothiazole: 1.25; percent yield, 76.7; percent ether insolubles, 4.1. Mole ratio amine to mercaptobenzothiazole: 1; percent yield, 68.7; percent ether insolubles 10.0.

EXAMPLE 3

A stirred slurry containing 83.2 grams (0.25 mole) of 2,2'-dithiobis(benzothiazole), 36.6 grams (0.5 mole) of tert.-butylamine, and 400 ml. of isopropyl alcohol was heated at 45°–50° C. for 10 minutes. To this stirred slurry, 178 ml. (0.33 mole) of aqueous sodium hypochlorite (13.7 grams per 100 ml.) was added dropwise at 45°–50° C. over a 1.5 hour period. Upon the addition of 50 ml. of water and stopping of the agitation, a two-layer system was noted. After cooling the stirred reaction mixture to 25° C. (precipitation occurred at 35° C.), 600 ml. of water containing 5 grams of sodium sulfite was added slowly over a 10-minute period. The stirred reaction mixture was maintained at 25°–30° C. for 15 minutes, the precipitate collected by filtration, washed with water until the washings were neutral to litmus, and air-dried at 50° C. N-tert.-butyl-2-benzothiazole sulfenamide, melting point 111°–112° C., was obtained in excellent yield. However, the yield dropped about 8% when aqueous medium was substituted for the alcohol, and it was again demonstrated that at least 50% excess of amine was required for equivalent results in the prior procedure. Furthermore, the alcohol reaction medium had an unexpected stabilizing influence on the product. Initially both products prepared from equivalent molar proportions of reactants, one in isopropanol and one in water, were more than 98% pure according to chemical assay, but after 21 days in an oven at 70° C. the assay of the product made in water was only 93%; whereas, the assay of the product made in alcohol was 96%.

EXAMPLE 4

A stirred slurry containing 84.5 grams (0.5 mole based on chemical assay) of 2-mercaptobenzothiazole, 56 grams (0.55 mole) of diisopropylamine (10% excess), and 500 ml. of isopropyl alcohol was heated at 45°–50° C. for 15 minutes. To this stirred slurry at 45°–50° C., 340 ml. (0.75 mole) of aqueous sodium hypochlorite (16.4 grams per 100 ml.) was added dropwise at 45°–50° C. over a two-hour period. The stirred reaction mixture was then diluted by the addition of 50 ml. of water and heated at 45°–50° C. for an additional 30 minutes. Upon stopping the stirrer, a two-layer system was noted. After cooling the stirred reaction mixture to 10° C., it was treated with 5 grams of sodium sulfite. Thereafter, 600 ml. of cold water was added slowly over a 10-minute period. The resultant precipitate was stirred at 10°–15° C. for 15 minutes, collected by filtration, washed with cold water until the washings were neutral to litmus, and air-dried at 25°–30° C. The yield was 109 grams (82%) of N,N-diisopropyl-2-benzothiazole sulfenamide, melting point 60°–61° C. The product was completely free of disulfide.

EXAMPLE 5

A stirred slurry containing 0.5 mole of 2-mercaptobenzothiazole (86.4 grams of 96.8% 2-mercaptobenzothiazole), 0.525 mole of tert.-butylamine (5% excess), and 250 ml. of 88% isopropyl alcohol was prepared. To this stirred slurry, aqueous sodium hypochlorite in 50% excess of the theoretical quantity was added dropwise at about 50° C. over a period of about an hour. The reaction mixture was then heated at 65°–70° C. for about 20 minutes, whereby substantially complete solution resulted. Ten grams of sodium sulfite was added after cooling the reaction mixture to 25° C. There was then added 750 ml. of cold water, and the precipitate was collected by filtration, washed with water, and dried. The product, N-tert.-butyl-2-benzothiazole sulfenamide, was obtained in a yield of 87.0%. Said product was 98.3% pure according to chemical assay and contained only traces of material insoluble in ether.

EXAMPLE 6

A stirred slurry containing 0.375 mole of 2,2'-dithiobis(benzothiazole) [129.7 grams of 96.1% 2,2'-dithiobis-(benzothiazole)], 0.86 mole of tert.-butylamine (15% excess), and 300 ml. of tert.-butanol was prepared. To the stirred slurry aqueous sodium hypochlorite in 40% excess of the theoretical quantity was added dropwise at about 50° C. over a period of about an hour. The reaction mixture was then heated at 65°–70° C. for about 30 minutes, whereby substantially complete solution resulted although a small amount of insoluble material remained. The reaction mixture was cooled to 25° C., and ten grams of sodium sulfite was added. There was then added 500 ml. of water, and the precipitate which formed was collected by filtration, washed with water, and dried. The product, N-tert.-butyl 2-benzothiazole sulfenamide, was obtained in a yield of 90%. Said product was 96.6% pure according to chemical assay and contained 2.3% of material insoluble in ether.

Direct replacement of tert.-butanol by ethanol and tert.-butylamine by cyclohexylamine in the foregoing procedure did not provide enough solvent to convert the organic constituents to substantially complete liquid phase and gave only a 40% yield; but increasing the ethanol to 400 ml. resulted in substantially complete solution and gave N-cyclohexyl-2-benzothiazole sulfenamide in 92.2% yield of 89.7% assay containing 3.8% material insoluble in ether. The excess of hypochlorite was 50%, and 1000 ml. of dilution water was used.

EXAMPLE 7

A stirred slurry containing 0.25 mole of 2,2'-dithiobis(benzothiazole) [87.5 grams of 97% 2,2'-dithiobis (benzothiazole)], 0.55 mole of cyclohexylamine (10% excess), and 300 ml. of 88% isopropyl alcohol was heated at 45°–50° C. for 15 minutes. To this stirred slurry aqueous sodium hypochlorite in 60% excess of the theoretical quantity (170.6 ml. of a solution containing 17.47 grams/ 100 ml.) was added dropwise at 45°–50° C. over a two-hour period. The reaction mixture was then heated to 65° C. and held at 60°–65° C. for 30 minutes. Upon stopping the stirrer, a two-layer liquid system was noted. Solids were all substantially in solution. The stirred reaction mixture was allowed to cool slowly to 30° C., and then ten grams of sodium sulfite was added in one portion. By means of an ice bath, the stirred reaction mixture was further cooled to 10° C., and 500 ml. of water was added at 5°–10° C. over a 15-minute period. Stirring was continued for about 15 minutes at 5°–10° C., and the reaction mixture was filtered, sucked dry, washed with one liter of water, and air-dried at 50° C. There was obtained a 93% yield of N-cyclohexyl-2-benzothiazole sulfenamide, melting point 103°–104° C., having a chemical assay of 97.5%. The yield was increased 3% by increasing the excess of cyclohexylamine to 20%.

EXAMPLE 8

A mixture containing 0.25 mole of 2,2'-dithiobis(benzothiazole) [85.7 grams of 97% 2,2'-dithiobis(benzothiazole)], 0.55 mole of tert.-butylamine (41.3 grams or 10% excess), and 300 ml. of 88% isopropyl alcohol was heated at 45°–50° C. for 15 minutes. To this stirred slurry aqueous sodium hypochlorite in 60% excess (170.6 ml. of solution containing 17.45 grams per 100 ml.) was added dropwise over a two-hour period. The stirred reaction mixture was then heated rapidly to 65° C. and held at 60°–65° C. for 10 minutes. Upon stopping the stirrer, a two-layer system was noted, the product being in substantially complete solution. The stirred reaction mixture was allowed to air cool slowly to 30° C., and then ten grams of sodium sulfite was added in one portion. By means of an ice bath, the stirred reaction mixture was further cooled to 10° C. and 750 ml. of water added at 5°–10° C. over a 15-minute period. Stirring was continued for about 15 minutes at 5°–10° C. and the reaction mixture was sucked dry, washed with one liter of water, and air-dried at 50° C. There was obtained a 91.5% yield of N-tert.-butyl-2-benzothiazole sulfenamide, melting point 113°–114° C., having a chemical assay of 99.5%.

EXAMPLE 9

A stirred charge containing 42 grams (0.25 mole) of 2-mercaptobenzothiazole, 27.5 grams (0.275 mole) of cyclohexylamine (10% excess), and 400 ml. of isopropyl alcohol was heated at 45°–50° C. for 15 minutes. To this stirred slurry, 192 ml. (0.32 mole) (12.4 grams/100 ml.) of aqueous sodium hypochlorite (28% excess) was added dropwise at 45°–50° C. over a two-hour period. After heating to 65° C. over a 15-minute period and upon stopping agitation, a two-layer system resulted. The stirred reaction mixture was cooled slowly to 30° C., and 5 grams of sodium sulfite was added. A precipitate formed at 54° C. After cooling to 10° C., 600 ml. of cold water was added at 10°–15° C. in 10 minutes. The stirred reaction mixture was maintained at 10°–15° C. for 15 minutes, the solids were collected by filtration, washed with water until neutral to litmus, and air-dried at 25°–30° C. The product, melting point 106°–107° C., was obtained in 97% yield. This product assayed 99.5%, and after storage in an oven at 50° C. for eight weeks the assay dropped only 3% as compared to 18% drop for a commercial sample of the same sulfenamide made in water.

EXAMPLE 10

A stirred charge containing 42 grams (0.25 mole) of 2-mercaptobenzothiazole, 500 ml. of isopropyl alcohol, 49.9 grams (0.27 mole) of distilled dicyclohexylamine (10% excess), boiling point 114° C./10 mm., was heated at 70°–80° C. for one hour. To this thick slurry, 210 ml. (0.35 mole) (12.4 grams/100 ml.) of aqueous sodium hypochlorite (40% excess) was added dropwise at 45°–50° C. over a two-hour period. After heating to 65° C. in 15 minutes and upon stopping agitation, a two-layer system resulted. The stirred reaction was cooled slowly to 30° C. and then 5 grams of sodium sulfite added. A precipitate formed at 37° C. Upon cooling to 10° C., 650 ml. of cold water was added slowly at 10°–11° C. over a ten-minute period. The stirred reaction mixture was maintained at 10°–15° C. for 15 minutes, the solids were collected by filtration, washed with water until the washings were neutral to litmus, and air-dried at 45°–50° C. The product, melting point 104°–105° C., was obtained in about 80% yield. The assay of this product was 97.2%. After recrystallization from ethyl alcohol, it melted at 106°–107° C. with an assay of 98.4%.

By the new process there is obtained from equivalent proportions of the reactants higher quality product in yields comparable to those obtained in aqueous medium with the excess required for optimum yield.

It is intended to cover all changes and modifications of the examples of the invention herein chosen for purposes of disclosure which do not constitute departures from the spirit and scope of the invention.

What is claimed is:

1. The process of making sulfenamides which comprises oxidizing in water-miscible monohydric alcohol substantially one molecular proportion of a member of the class consisting of 2-mercaptobenzothiazole and 2,2′-dithiobis(benzothiazole) and substantially one equivalent proportion of amine of the formula

where R is selected from the class consisting of lower secondary alkyl, lower tertiary alkyl, and lower cycloalkyl and R′ is selected from the class consisting of hydrogen, lower alkyl, and lower cycloalkyl with aqueous oxidizing agent selected from the class consisting of alkali metal hypohalite, hydrogen peroxide, potassium persulfate, and potassium ferricyanide; converting the organic components of the reaction mixture containing sulfenamide product to substantially complete solution; and recovering 2-benzothiazole sulfenamide corresponding to the amine reactant.

2. The process of claim 1 wherein the alcohol is isopropanol and the oxidizing agent is sodium hypochlorite.

3. The process of making sulfenamides which comprises oxidizing at 45°–80° C. in isopropanol a mixture of substantially one molecular proportion of a thiazole of the class consisting of 2-mercaptobenzothiazole and 2,2′-dithiobis(benzothiazole) and substantially one equivalent proportion of amine of the formula

where R is selected from the class consisting of lower secondary alkyl, lower tertiary alkyl, and lower cycloalkyl and R′ is selected from the class consisting of hydrogen, lower alkyl, and lower cycloalkyl with aqueous alkali metal hypohalite in amount sufficient to provide free oxidizing agent at the end of the reaction; converting the organic components of the reaction mixture containing sulfenamide product to substantially complete solution; and recovering 2-benzothiazole sulfenamide corresponding to the amine reactant.

4. The process of claim 3 wherein the amine is isopropylamine.

5. The process of claim 3 wherein the amine is tert.-butylamine.

6. The process of claim 3 wherein the amine is diisopropylamine.

7. The process of claim 3 wherein the amine is cyclohexylamine.

8. The process of claim 3 wherein the amine is dicyclohexylamine.

9. The process of claim 3 wherein oxidation is effected at 45°–55° C. in insufficient solvent to dissolve the sulfenamide and the organic components of the reaction mixture are converted to substantially complete solution by heating at 55°–80° C.

10. The process of claim 9 wherein the reaction mixture containing the organic components in substantially complete solution is cooled and diluted with water.

11. The process of claim 10 wherein the conversion of the organic components to substantially complete solution and the cooling are done under oxidizing conditions.

12. The process of claim 11 wherein the amine is tert.-butylamine.

13. The process of claim 11 wherein the amine is cyclohexylamine.

14. Process of claim 2 wherein the amine is tert.-octylamine.

References Cited

UNITED STATES PATENTS 2,772,279  11/1956  Leshin _____ 260—306.6

FOREIGN PATENTS 519,617  4/1940  Great Britain _____ 260—306.6

ALTON D. ROLLINS, Primary Examiner